United States Patent [19]

Kenmochi et al.

[11] Patent Number: 4,932,048

[45] Date of Patent: Jun. 5, 1990

[54] DATA COMMUNICATION APPARATUS WITH VOICE COMMUNICATION CONTROL

[75] Inventors: Toshio Kenmochi; Takaaki Hashimoto, both of Yokohama, Japan

[73] Assignee: Canon Kabushiki Kaisha, Tokyo, Japan

[21] Appl. No.: 403,842

[22] Filed: Sep. 5, 1989

Related U.S. Application Data

[63] Continuation of Ser. No. 37,956, Apr. 13, 1987, abandoned.

[30] Foreign Application Priority Data

Apr. 15, 1986 [JP] Japan .................................. 61-086269
Oct. 14, 1986 [JP] Japan .................................. 61-244601

[51] Int. Cl.⁵ ...................... H04M 1/65; H04M 11/06
[52] U.S. Cl. ........................................ 379/67; 379/70; 379/100
[58] Field of Search .............. 379/67, 74, 77, 79, 379/80, 82, 97, 100, 102, 104, 105, 70; 370/62, 76, 94, 110.1

[56] References Cited

U.S. PATENT DOCUMENTS

| | | |
|---|---|---|
| 4,353,097 | 10/1982 | Takeda et al. . |
| 4,403,322 | 9/1983 | Kato et al. .................. 370/110.1 |
| 4,476,559 | 10/1984 | Brolin et al. .................. 370/110.1 |
| 4,578,537 | 3/1986 | Faggin et al. .................. 379/100 |
| 4,584,434 | 4/1986 | Hashimoto .................... 379/100 |
| 4,596,901 | 6/1986 | Hanscom et al. ............... 379/76 |
| 4,625,079 | 11/1986 | Castro et al. ................... 379/77 |
| 4,660,218 | 4/1987 | Hashimoto .................... 379/82 |
| 4,677,660 | 6/1987 | Yoshida ........................ 379/100 |
| 4,773,080 | 9/1988 | Nakajima et al. . |
| 4,794,637 | 12/1988 | Hashimoto .................... 379/100 |
| 4,800,439 | 1/1989 | Yoshino . |
| 4,815,121 | 3/1989 | Yoshida . |

FOREIGN PATENT DOCUMENTS

| | | | |
|---|---|---|---|
| 58-120371 | 7/1983 | Japan ........................ 379/100 |
| 58-170277 | 10/1983 | Japan ........................ 379/100 |
| 59-214366 | 12/1984 | Japan ........................ 379/100 |
| 2166624 | 5/1986 | United Kingdom ........... 379/102 |

Primary Examiner—Steven L. Stephan
Assistant Examiner—James E. Tomassini
Attorney, Agent, or Firm—Fitzpatrick, Cella, Harper & Scinto

[57] ABSTRACT

A communication apparatus includes a voice communication means and a data communication means. A detection means detect a signal relating to the data communication during voice communication by the voice communication means, and a control means effects data communication in accordance with the output of the detection means.

6 Claims, 16 Drawing Sheets

DATA COMMUNICATION APPARATUS WITH VOICE COMMUNICATION CONTROL

This application is a continuation of application Ser. No. 037,956 filed Apr. 13, 1987, now abandoned.

BACKGROUND OF THE INVENTION

1. Field of the Invention

The present invention relates to a communication apparatus which communicates voice and data.

2. Related Background Art

A prior art apparatus of this type such as facsimile machine is connected to a telephone line together with a telephone set, and the telephone set and the facsimile machine are selectively connected to the telephone line by a switching relay.

The telephone line is normally connected to the telephone set, and when the facsimile machine is set to an automatic receive mode, the telephone line is switched to the facsimile machine from the telephone set in response to a call signal from the line.

As a result, when the facsimile machine is set in the automatic receive mode, the telephone set cannot be used, and when the facsimile machine is set in a manual receive mode, the facsimile machine cannot receive message if an operator is absent.

A multi-function telephone set which responds by voice has been known. When such a multi-function telephone set and the facsimile machine are connected to one telephone line, the telephone set cannot be effectively used by merely switching the telephone set and the facsimile machine.

A multi-function telephone set having an automatic recording and answering function, once set to a record mode, it cannot be externally switched to a reproduce mode, and once a voice message for the reproduce mode is set, the content of the voice message cannot be externally changed.

SUMMARY OF THE INVENTION

It is an object of the present invention to resolve the above problems.

It is another object of the present invention to provide an improved communication apparatus.

It is another object of the present invention to provide a communication apparatus which can efficiently use a voice communication function and a data communication function.

It is another object of the present invention to provide a communication apparatus which can communicate voice and data in parallel.

It is another object of the present invention to provide a communication apparatus which can automatically communicate data after automatic voice communication.

It is another object of the present invention to provide a communication apparatus having a mode for automatically communicating data for a call from a line, a mode for communicating data after automatic voice response and a telephone speech mode.

It is another object of the present invention to provide a communication apparatus which can automatically receive voice and data.

It is another object of the present invention to provide a communication apparatus which can automatically communicate data after voice communication and can shift to a speech mode during voice communication.

It is another object of the present invention to provide a communication apparatus which can receive voice and data on one incoming line.

It is another object of the present invention to provide a communication apparatus having an automatic voice response mode which can externally change a voice response message.

It is another object of the present invention to provide a communication apparatus having an automatic recording and answering function which automatically reproduces a recorded content.

Other objects, features and advantages of the present invention will be apparent from the following description of the preferred embodiments.

DETAILED DESCRIPTION OF THE PREFERRED EMBODIMENTS

A first embodiment of the present invention is now explained in detail with reference to the drawings.

Figure 1:
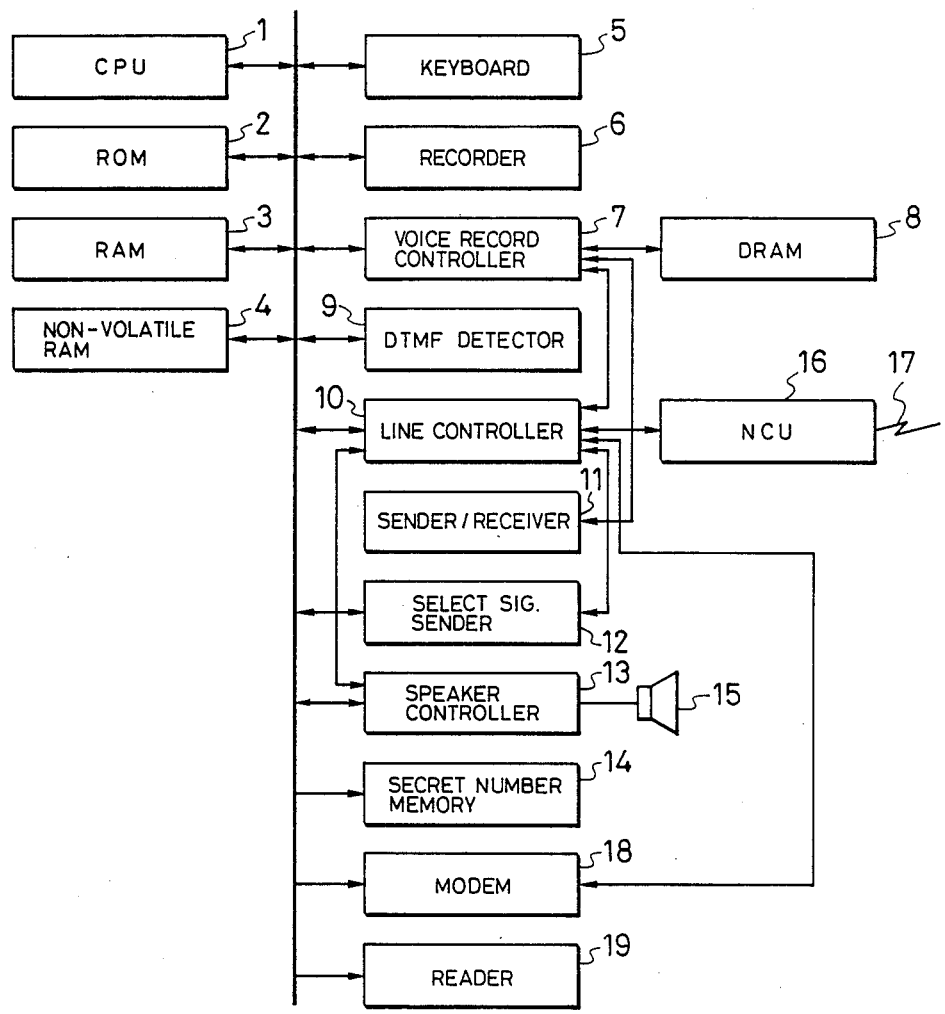
FIG. 1 shows a block diagram of a first embodiment of the present invention.

FIG. 1 shows a block diagram of the first embodiment. In the first embodiment, a facsimile machine which contains a telephone set is used.

A central processing unit (CPU) 1 controls an overall facsimile machine. It operates under control of software stored in a read-only memory ROM 2 to control a random access memory (RAM) 3, a non-volatile memory (RAM) 4, a keyboard 5, a recorder 6, a voice record control unit 7, a dial tone modulation frequency (DTMF) detection unit 9, a line control unit 10, a select signal send unit 12, a speaker control unit 13 and a secret number memory 14.

Figure 2:
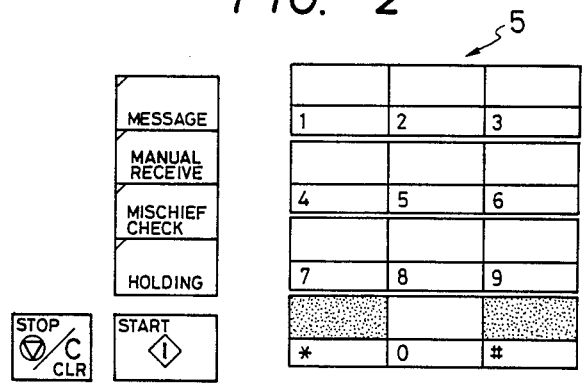
FIG. 2 shows a keyboard in the first embodiment.

The keyboard 5 is constructed as shown in FIG. 2 and comprises a ten-key panel used to send select signals and various mode buttons and is always monitored by the CPU 1.

The recorder 6 comprises a thermal head printer and a controller thereof, and reads out the data stored in the RAM 3 and RAM 4 under the control of CPU 1 and prints them out in a form of hard copy.

The voice record control unit 7 is controlled by the CPU 1 and compresses an analog input signal from a handset (or a sender/receiver) 11 and the line control unit 10 by a known adaptive differential modulation (ADM) voice compression method, converts it to a one-bit digital signal and stores it into a DRAM 8. It also converts the information stored in the DRAM 8 into an analog signal, sends it to the handset 11 and the speaker control unit 13 to output it to an operator, under the control of the CPU 1. The DTMF detection unit 9 detects a DTMF signal from a line 17 through a network control unit NCU 16 and a DTMF signal from the select signal send unit 12, as required, and informs the content thereof to the CPU 1. The line control unit 10 selectively connects the line 17 through the NCU 16 to the voice record control unit 7, DTMF detection unit 9, handset and select signal send unit 12, under the control of the CPU 1.

The NCU 16 separates a primary circuit and a secondary circuit by a transformer and separates input and output by a hybrid circuit.

The handset 11 has one function of reproducing voice from a voice signal of the line 17 through the line control unit 10 and a voice signal from the voice control unit 7 and another function of sending voice.

Namely, the handset 11 comprises a transmitter unit including a voice recording microphone and a transmitter, and a receiver unit.

The select signal send unit 12 sends dial pulse signals for 0–9 and push-phone (dial tone) signals for 0–9 and * and # in accordance with data from the CPU 1 and selects those signals by a control signal from the CPU 1.

The speaker control unit 13 causes the speaker 15 to output the signal from the line control unit 10 under the control of the CPU 1.

The secret number memory 14 comprises two rotary dip switches and the CPU 1 is informed of the number.

A modem unit 18 comprises G3, G2, G1 and FM modems and a block generation circuit. The modem unit 18 modulates transmission data stored in the RAM 3 under the control of the CPU 1 and supplies it to the line through the line control unit 10 and the NCU 16. The modem unit 18 demodulates an analog signal received through the line 17, NCU 16 and line control unit 10 and stores binary data into the RAM 3.

A reader 19 comprises CCD (Charge Coupled Device), TTL (Transistor Transistor Logic), IC and so on. The reader 19 binarizes data read by the CCD under the control of the CPU 1 and stores the data into the RAM 3.

The CPU 1 and the ROM 2 form switching control means, which controls switching from a reproducing state to a recording state or vice versa, in response to an external input signal.

Figure 3:
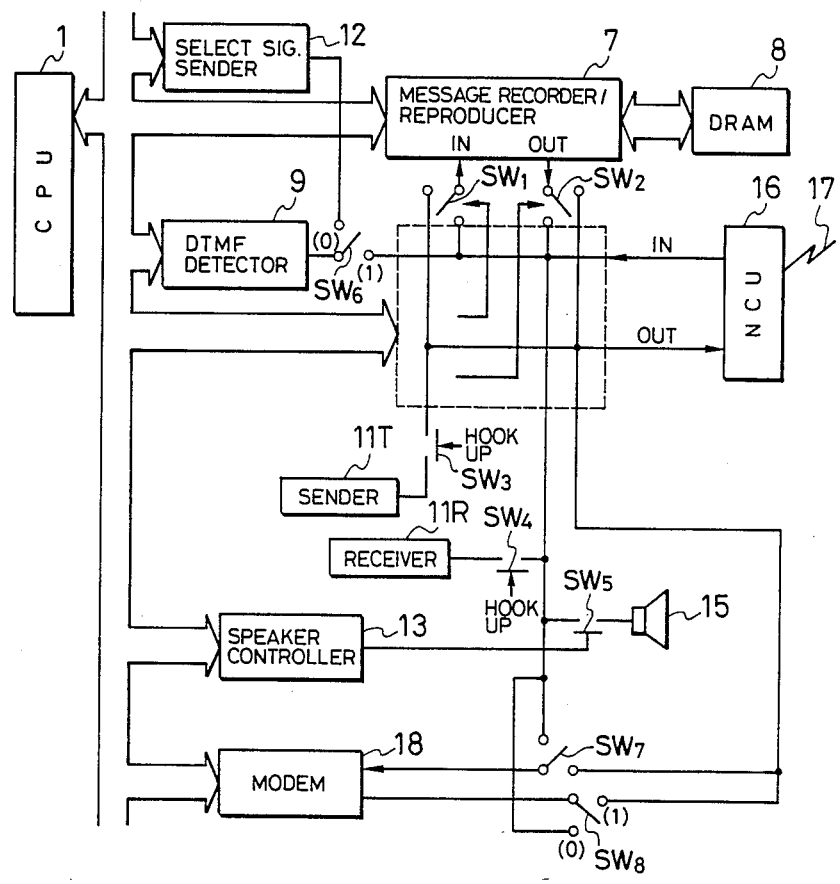
FIG. 3 shows a circuit connection block diagram in the first embodiment.

FIG. 3 shows a block diagram of a periphery of the line in the embodiment.

The operation of the embodiment is now explained.

Figure 4A:
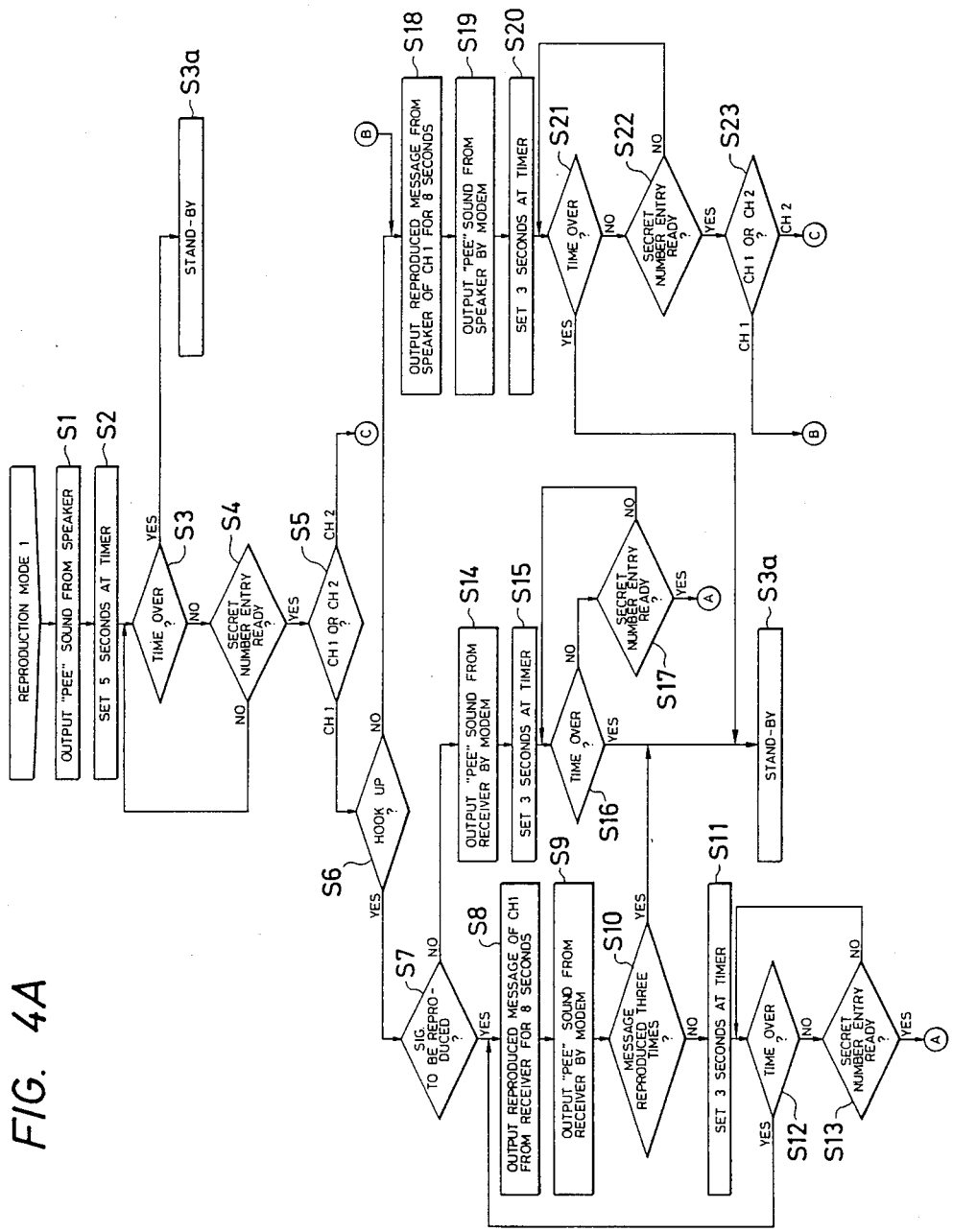
FIGS. 4A and 4B show flow charts of an operation in a reproduce mode in the first embodiment.
Figure 4B:
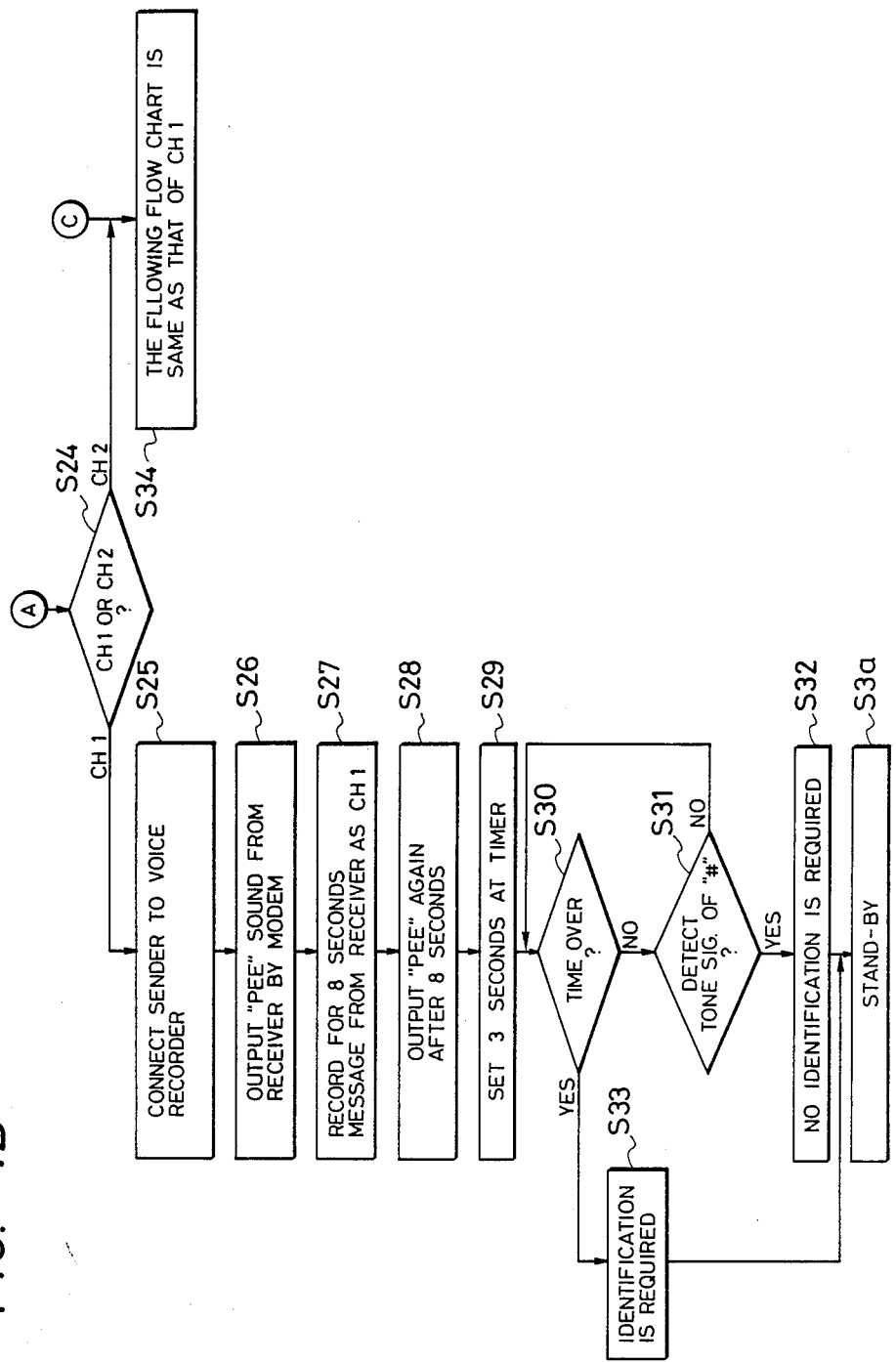

FIGS. 4A and 4B show flow charts of voice recording and reproducing operations in the embodiment.

There are two ways to record and reproduce voice In one method, an operator directly handles a telephone set to record and reproduce voice. In the other method, an operator records and reproduces voice from off-site through a telephone line.

On-site recording operation is first explained.

The message key shown in FIG. 2 is first depressed to start a mode 1.

The modem 18 sets the switch 8 to "0", turns on the switch 5, supplied a "pee" sound to the speaker 15 (S1) and informs acceptance of a secret number to the operator. The timer is set to 5 seconds (S2), the time-over is monitored (S3), the switch 6 is set to "0" so that the select signal send unit 12 sends not DTMF. If the secret number entered by the operator through the ten-key comprises two digits stored in the secret number memory 14 and "#", the secret number is accepted (S4). If the time runs out, the secret number is not accepted (S3a).

The secret numbers are set by the two rotary dip switches, one for a channel 1 and the other for a channel 2. Voice can be recorded and reproduced for eight seconds in each of the channels 1 and 2. If the two rotary dip switches are set to "41", the two secret numbers of the channels 1 and 2 are "41#" and "81#", respectively, and if the rotary dip switches are set to "77", the two secret numbers are "77#" and "17#", respectively. That is, they are "41#" and "(4+4)1#" 1, and "77#" and "(7+4)1#".

Let us assume that the secret numbers "41#" and "81#" correspond to the channels 1 and 2, respectively. If the secret number "81#" is detected (S4), the procedure in the channel 1 to be described later is carried out (S34).

On the other hand, if "41#" is depressed, the hook-up state is checked (S6), and if it is hooked up and the channel 1 has been prerecorded (S7), reproduced sound of the channel 1 is sent to the receiver 11R for eight seconds by the voice reproduce unit 7 (S8). Then, the modem 18 sends a "pee" sound to the receiver 11R (S9) to inform the start of acceptance of the next secret number to the operator.

The number of times of reproduction, is checked (S10), and if eight-second reproduction has been carried out three times in one reproduce mode, the process stands by (S3a). Otherwise, the timer is set to three seconds (S11), and the depression of the secret number is monitored. If the time runs out (S12), the process returns t S8, and reproduction is again started.

If the depression of "41#" or "81#" is detected (S13), and if it is "41#" (S24), the process proceeds to the record mode (S25). If it is "81#" (S24), the reproduce mode of the channel 2 is started. The subsequent operation is similar to that of the channel 1 (S34).

On the other hand, the handset 11T is connected to the voice record unit 7 (S25), and a "poh" sound is sent from the modem unit 18 to the receiver 11R (S26) to inform the start of recording to the operator. The voice from the handset 11T is recorded to the channel 1 for eight seconds (S27), and after the eight-second period, a "pou" sound is again sent to the operator (S28). Then, the timer is set to 3 seconds (S29), the timer-over is monitored (S30), and the "#" tone is detected. If it is detected within 3 seconds (S31), the recorded message can be reproduced without the secret number (S32). If it is not detected within 3 seconds, the recorded message is reproduced upon detection of the secret number "41#" (S33).

If there is no reproduce signal (S7), the modem unit 18 sends a "pee" sound to the receiver 11R (S14). The timer is set to 3 seconds (S15), and whether the secret number is correct or not is checked in the 3-second interval (S16, S17). If the secret number is correct, the process proceeds to a step S24.

On the other hand, if the handset is not hooked up (S6), the voice reproduce unit sends the reproduced sound to the speaker of the channel 1 for 8 seconds (S18), the modem unit 18 sends a "pee" sound to the speaker (S19), the timer is set to 3 seconds (S20), whether the secret number is correct or not is checked in the 3-second interval (S21, S22), and if it is correct, the channel number is determined (S23). If it is channel 1, the process proceeds to the step S18, and if it is channel 2, the process proceed to a step S34.

Figure 5A:
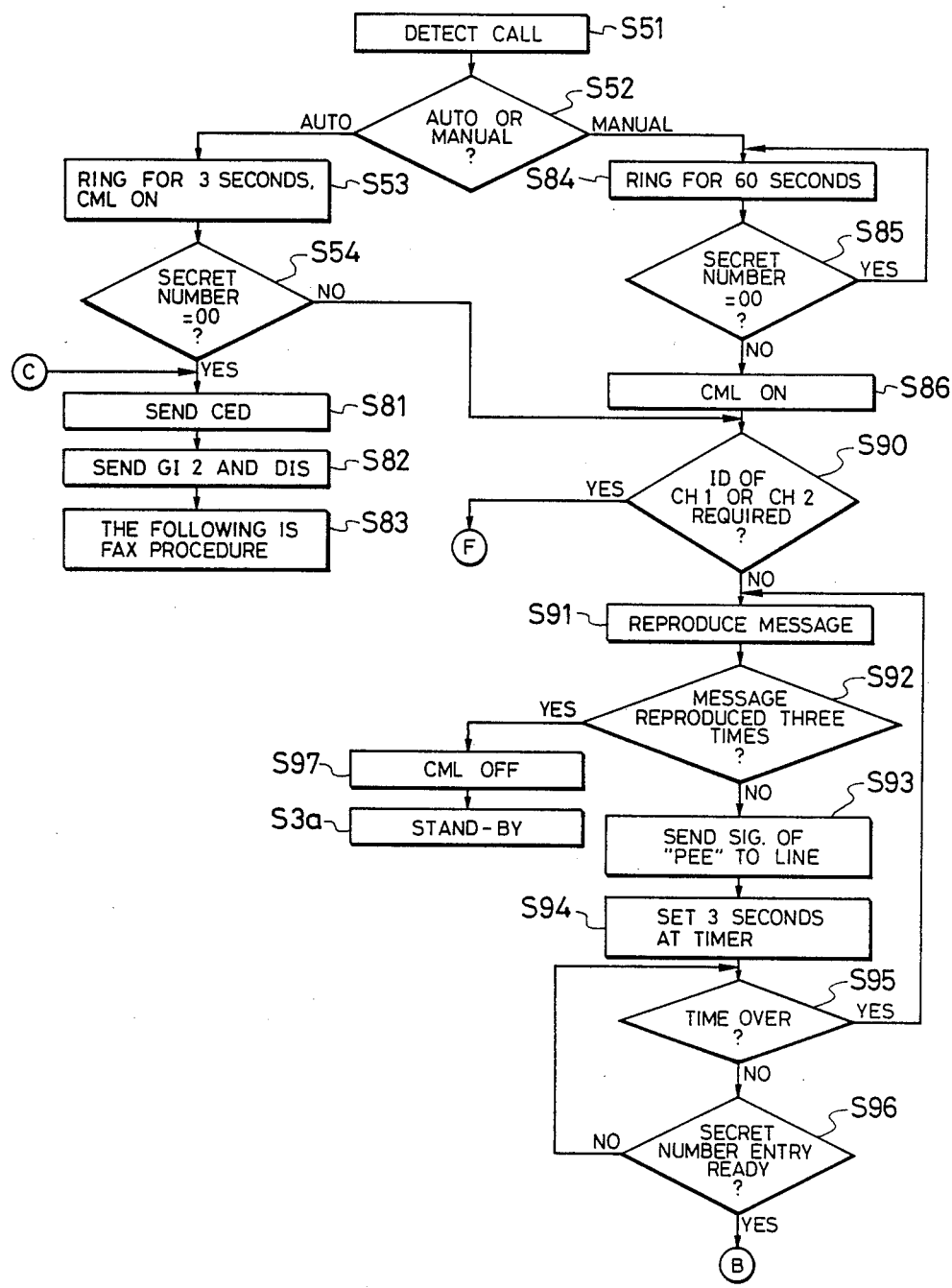
FIGS. 5A to 5C show flow charts of an operation in a second reproduce mode in the first embodiment.
Figure 5B:
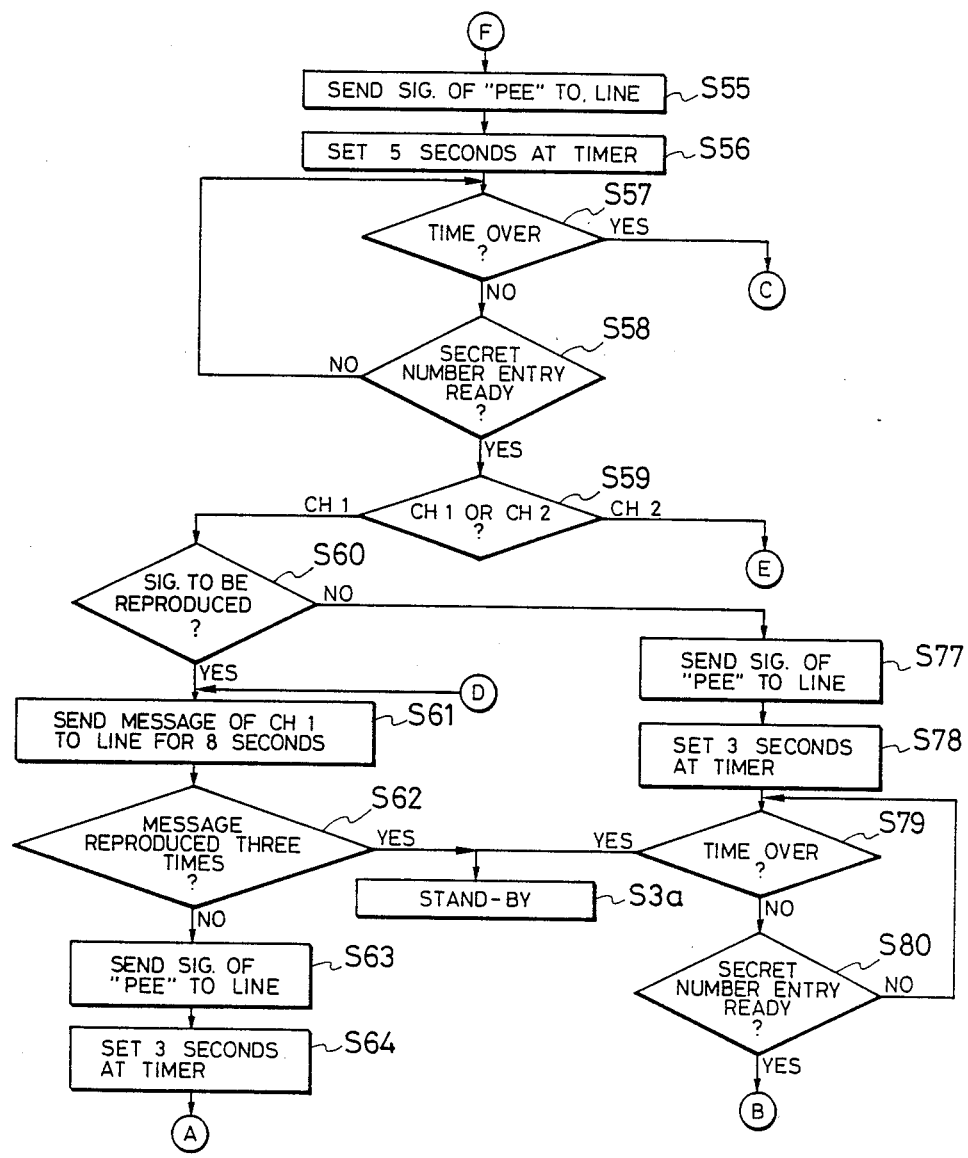
Figure 5C:
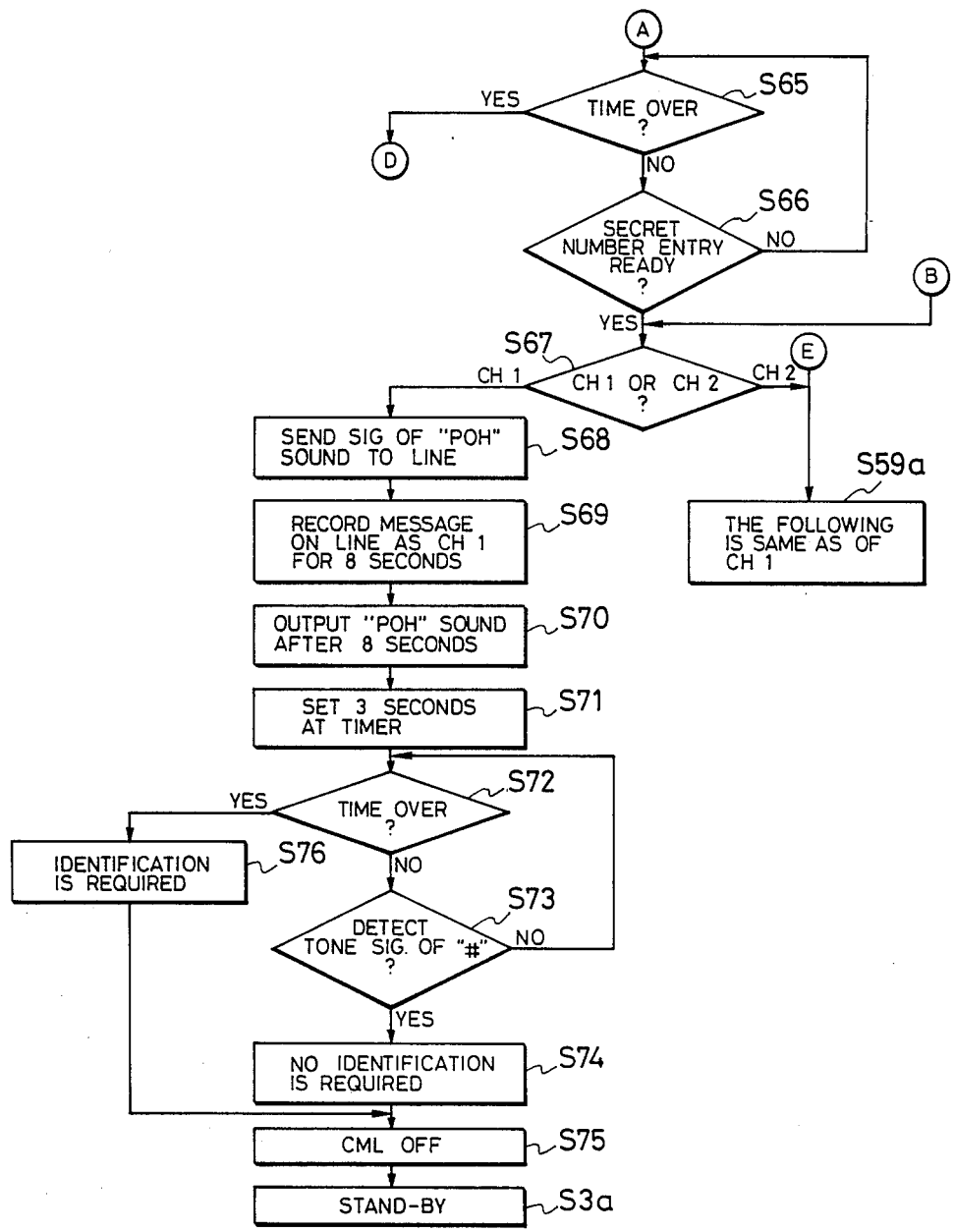

The operation when the operator reproduces or records from an off-site through a line is explained. FIG. 5 shows a flow chart of such an operation.

When the facsimile machine detects an external call (S51), it detects the auto/manual receive mode of FIG.

2 (S52). If it is the auto-receive mode in the step S52, a ringing tone is sent for 3 seconds, and if an operator does not respond, a communication line relay (CML) is turned on (S53) and the process proceeds to a step S54. In the step S54, whether the secret number stored in the secret number memory 14 is "00" or not is checked, and if it is 00, a called equipment identification (CED) is sent (S81) and GI2 and a digital identification signal (DIS) are sent (S82). Then, a facsimile procedure is started (S83).

If the secret number is not "00" in the step S54, whether at least one of the channels 1 and 2 is to b reproduced for a designated calling station or not is checked (S90), and if there is a non-designated reproduction channel, it is reproduced (S91). In this manner, after automatic reception, either the voice mode to record or reproduce voice or the facsimile procedure is selected.

The time-over is monitored (S95, S96) and the message is sent three times until the secret number is entered (S92, S93, S94, S95, S91). If the secret number is entered in the step S96, the process proceeds to a step S67. If reproduction is carried out three times, CML is turned off (S97) and the process stands by (S3a).

On the other hand, if there is no non-designated reproduction channel in the step S90, a "pee" sound is sent to the line (S55) to inform to the operator the start of registration of the secret number, and the 5-second timer is set (S56). The time-over is monitored (S57), and if the secret number (for example, "41#" or "81#") is detected (S58), the process proceeds to a step S59 where the channel number is checked. If the time-over is detected in the step S57, a called equipment identification (CED) is sent and the facsimile procedure is carried out (S81–S83).

In the step S59, the channel number is checked. If "41#" is detected, it is the channel 1 and the process proceeds to a step S60. If "81#" is detected, it is the channel 2, and the same operation as that for the channel 1 is carried out (S59a). In the step S60, the reproduction sound is checked. If it is detected, the reproduce mode is started (S61), and if no reproduction sound is detected, the record mode is started (S77). If the reproduction sound is detected (S60), the reproduction sound of the channel 1 is sent to the line for 8 seconds (S61), and whether the reproduction has been carried out 3 times or not is checked (S62). If it has been done 8 seconds ×3 times, CML is turned off and the process stands by (S3a).

If it has not been carried out 8 seconds × 3 times (S62), the time-over is monitored and the entry of the secret number is monitored. If DTMF of the secret number is sent from the calling telephone through the line (S63, S64, S65, S66), the process proceeds to a step S67. Otherwise, the process returns to the step S61 to repeat the reproduction.

Whether the secret number is from the channel 1 or the channel 2 is checked (S67), and if it is from the channel 1, the record mode is started (S68), and if it is from the channel 2, the reproduce mode for the channel 2 is started (S59a).

A "pou" sound is sent to the line (S68) to inform the operator of the start of recording. The voice on the line is recorded in the channel 1 for 8 seconds (S69), and after the 8-second period, a "pou" sound is generated to inform the end of recording (S70), and the timer is set to 3 seconds (S71). The time-over is monitored, and "#" sound (DTMF), to allow the recording station operator to determine whether a person who reproduces the recorded content is to be designated or not, is detected (S72, S73). If the time-over is detected in the step S72, the designation of the reproducing person is set, and if "#" sound is detected in the step S73, the non-designation of the reproducing person is set (S74, S76), CML is turned off (S75) and the process stands by.

On the other hand, if the reproduction sound is not detected in the step S60, a "Pee" sound is sent to the line (S77) to inform the operator of the secret number record mode, and the entry of the secret number is monitored. If the 3-second interval is timed out (S78, S79), CML is turned off and the process again stands by (S3a).

If the secret number is entered (S80), the record mode is started (S67).

Only when the channel 1 or 2 is designated and there is no reproduction sound in that channel, can the record mode be carried out (S60, S77–S80, S67–S69). If there is reproduction sound in the channel (S60), it is reproduced (S61, S62) and the process stands by (S3a) and does not move to the record mode. Namely, if there is reproduction sound, the record mode is not started.

In other words, the recording and reproduction are permitted after all stored voice signals have been reproduced.

In accordance with the present embodiment, the recorded content can be externally reproduced and modified.

Referring to FIGS. 6 to 15, a second embodiment of the present invention is explained in detail.

Figure 6:
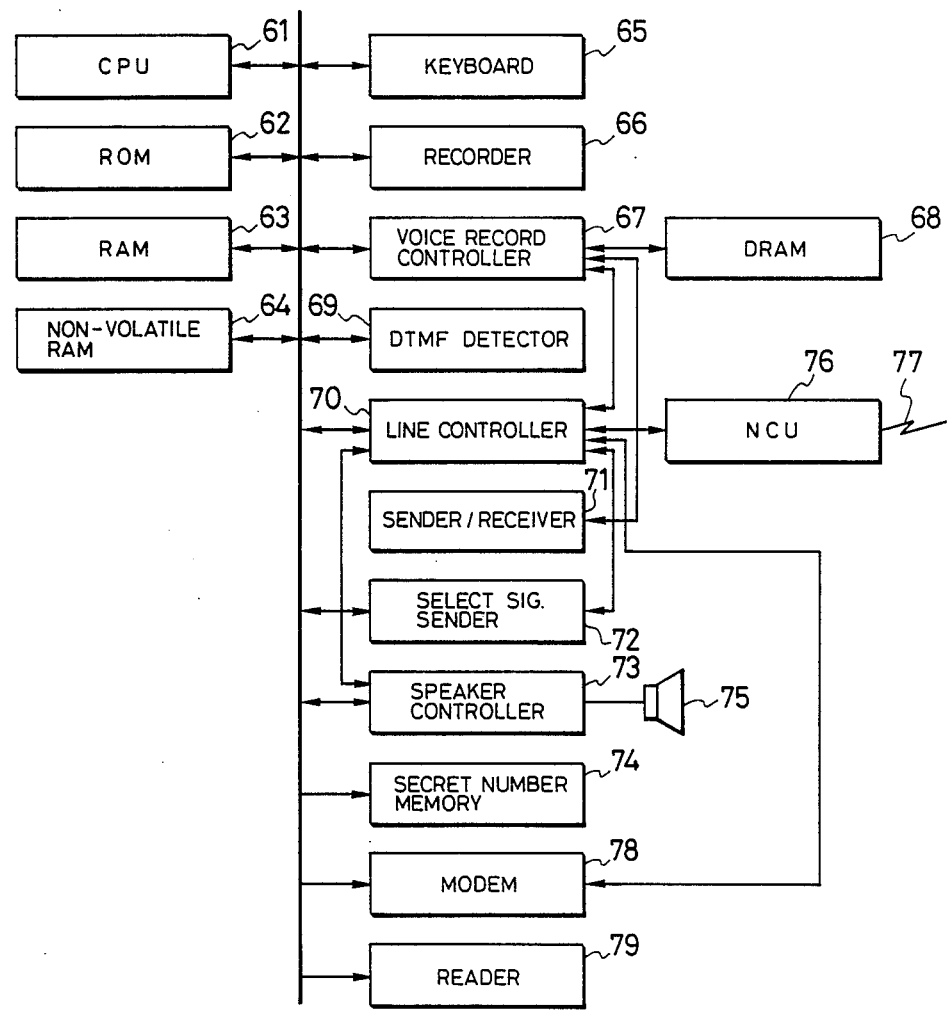
FIG. 6 shows a block diagram of the second embodiment of the, present invention.

FIG. 6 shows a block diagram of an integrated telephone/facsimile machine. Numeral 61 denotes a main CPU which controls the telephone set. It is operated under control of software stored in a ROM 62 and controls a RAM 63, a non-volatile RAM 64, a keyboard 65, a recorder 66, a voice record control unit 67, a tone dial signal (DTMF) detector 69, an NCU 76, a select signal sender 72, a speaker control unit 73, a secret number memory 74, a modem 78 and a reader 79.

The CPU 61 also encodes and decodes image data. An encode/decode system in the present embodiment may be modified Huffman (MH) or modified READ (MR). The RAM 63 stores the data supplied from the reader or stores data to be transferred to the recorder.

The non-volatile RAM 64 stores data to be retained when a system power supply is turned off.

Figure 7:
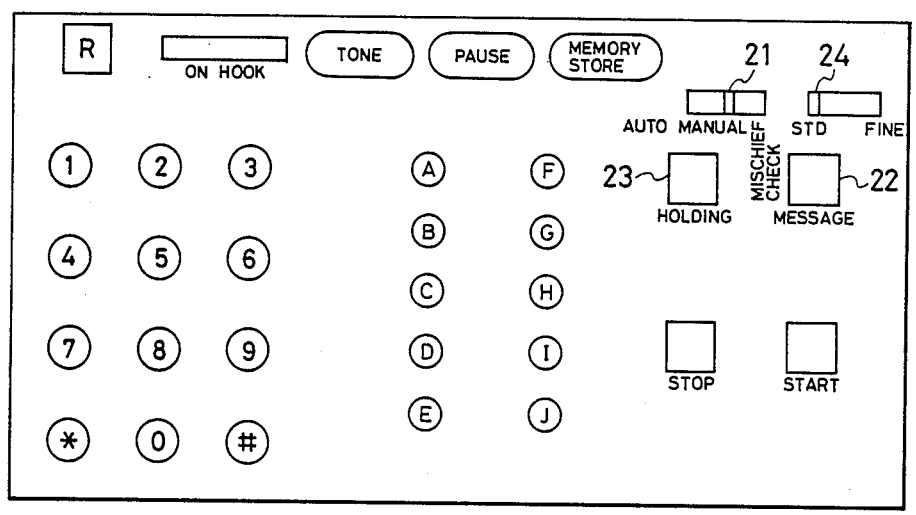
FIG. 7 shows a console panel of the second embodiment.

The keyboard 65 is constructed as shown in FIG. 7 and comprises a ten-key panel to send a select signal and various mode buttons. It is always monitored by the CPU 61.

The recorder 66 comprises a thermal head printer and a controller thereof and reads out the record data stored in the RAMs 63 and 64 and prints it out as hard copies under the control of the main CPU 61.

The voice record control unit 67 is controlled by the main CPU 61 and compresses an analog input signal supplied from a handset 71 and a line control unit 70 by a known ADM system and converts it to a 1-bit digital signal and stores it in a DRAM 68. It also converts the information stored in the DRAM 68 to an analog signal and sends it to the handset 71 and a speaker control unit 73 through the line control unit 70 under the control of the CPU 61.

The DTMF detector detects the DTMF signal from the line 77 through the NCU 76 or the DTMF signal from the select signal sender 72, as required, and informs the value thereof to the main CPU 61.

The line control unit 70 selectively connects the line 77 to the voice record control unit 67, DTMF detector 69, handset 71 or select signal sender 72 through the NCU 76, under the control of the main CPU 61.

The NCU 76 isolates the primary circuit and the secondary circuit of the line 77 by a transformer, separates the input and output circuits by a hybrid circuit and supplies it to the line control unit 70.

The handset 71 has one function of reproducing voice on the line 77 through the line control unit 70 and voice from the voice control unit 67, and another function of sending voice.

The select signal sender sends dial pulse signals 0–9 and push-button (dial tone) signals 0–9, * and # in accordance with data supplied from the CPU 61, and selects one of the systems by a control signal from the CPU 61.

The speaker control unit 73 controls the line control unit 70 to selectively produce the output from the speaker 75, under the control of the CPU 61.

The secret number memory 74 comprises two rotary dip switches. The CPU 61 is informed of its value.

The modem 78 comprises G3, G2, G1 and FM modems and a block generation circuit. It modulates transmission data stored in the RAM 63 under the control of the main CPU 61 and supplies it to the line 77 through the line control unit 70 and the NCU 76. It also receives the analog signal on the line 77 through the NCU 76 and the line control unit 70, decodes it and stores resulting binary data into the RAM 63.

The reader 79 comprises a CCD and a TTL, IC, and binarizes the data read by the CCD and stores it into the RAM 63 under the control of the main CPU 61.

The configuration of the second embodiment is basically identical to that of the first embodiment.

The operation of the second embodiment is explained in detail with reference to flow charts of FIGS. to 15 which show control operations of the CPU 61.

A program for performing the following operation is stored in the ROM 62. When a telephone call signal is received, the presence or absence of the call signal (Ci) is checked for 6 seconds in a step S101, and if Ci does not continue for 6 seconds the machine is turned off, and if Ci is detected as continuing 6 seconds, the process proceeds to a step S102. In the present embodiment, Ci is detected by the CPU 61 by checking whether the line control unit has detected Ci or not. In the step S102, whether a slide switch 21 of FIG. 7 is in an auto-receive mode or not is checked. If it is not in the auto-receive mode, the process proceeds to a step S103, and if it is in the auto-receive mode, a closed loop of the line 77 is established (line capture) and the process proceeds to a step S105. In the step S103, whether the slide switch 21 of FIG. 7 is in the manual receive mode or not is checked, and if it is in the manual receive mode, the machine operates as a conventional telephone set and operator call bell is rung.

If the slide switch 21 is in the auto-receive mode, the process proceeds to the step S105 from the step S102. If the slide switch 21 is in a mischief prevention mode, the process proceeds to a step S104 from the step S103. In the step S104, whether Ci has been detected for 9 seconds following to the step S101 (total of 15 seconds) or not, and if Ci is not detected for 9 seconds, the machine is turned off. If Ci is detected for 9 seconds, a closed loop of the line 77 is established (line capture) and the process proceeds to the step S105. If the handset is taken of the hook during the steps S101 to S104, Ci is disconnected and the process does not proceed to the next step and the machine operates as a conventional telephone set.

In the step S105, if the secret number has been set to "00", the message function (automatic voice response) is not carried out and the process proceeds to a step S181 to start the facsimile receive operation. If the secret number is not "00" whether a voice message has been recorded (stored) in Ch 1 (one of the voice data regions of the DRAM 68) or not is checked in a step S106. If it is recorded, 0.5 second is idled in a step S106-1 and then the voice message data of Ch 1 is reproduced and sent in a step S107, and then the process proceeds to a step S108-1. If the voice message is not stored in Ch 1, 1.05 second is idled in a step 108 and then the process proceeds to the step S108-1. The voice message of the Ch 1 can be freely set (recorded) by the operator. It is a message to respond to a telephone call from another station. The idling for 0.5 second in the step S108 is required for the following reason. If the voice is sent out simultaneously taneously with the connection of the line, the operator will have difficulty hearing it. Further, the sending of the voice should be avoided during an unstabilized period immediately after the establishment of the closed loop of the line.

In the step S108-1, the voice message (which indicates the presence of the facsimile function such as "Facsimile function is provided") stored in a predetermined area of the ROM 62 or DRAM 68 is reproduced and sent to the line 77. In this manner, the provision of the facsimile function is informed to the calling station.

Figure 9:
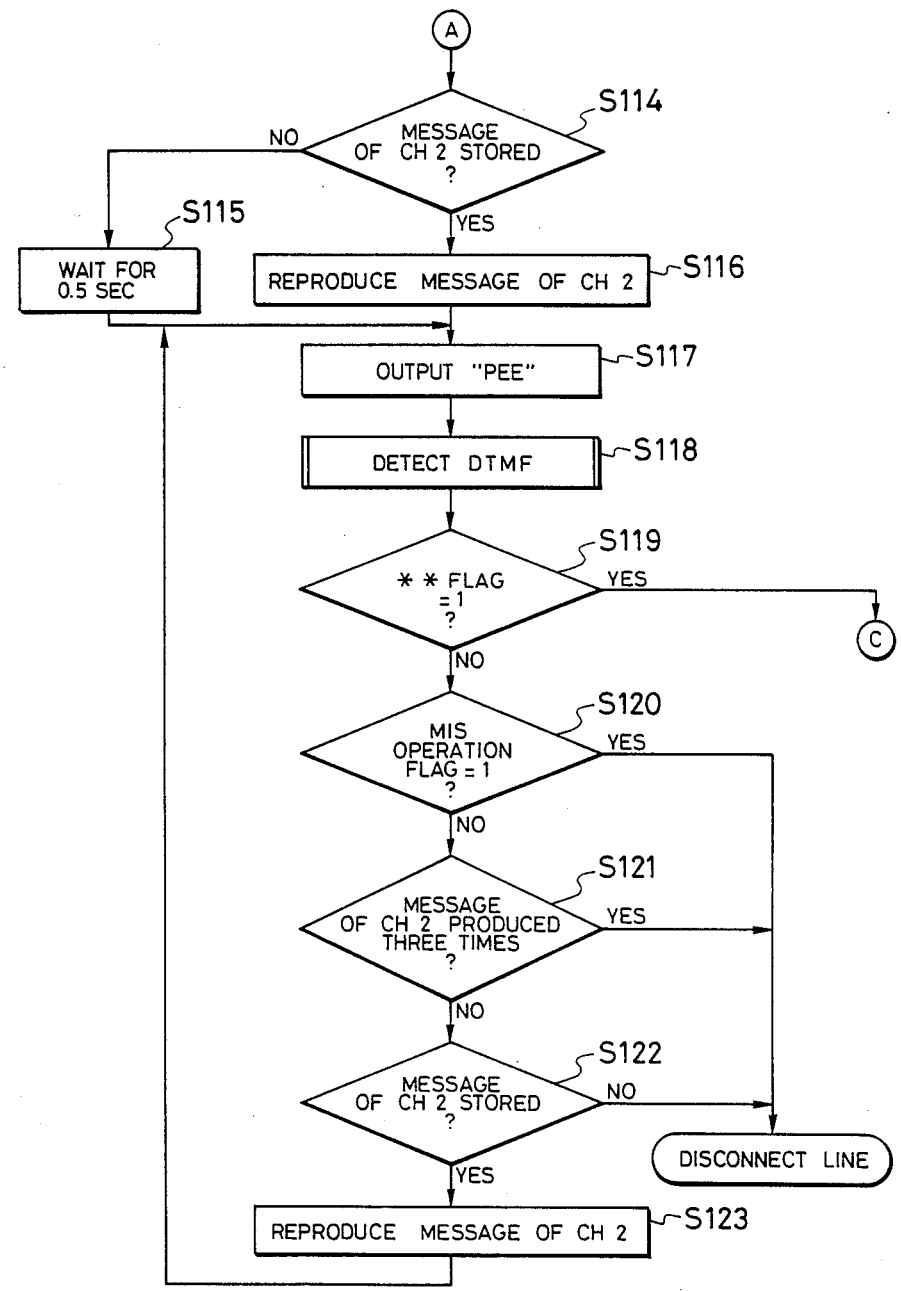
Figure 10:
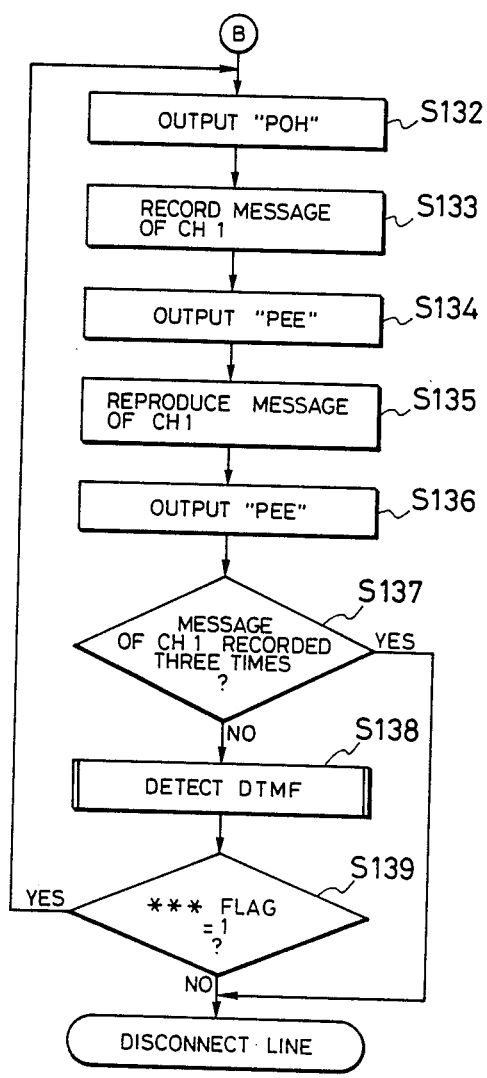
Figure 11:
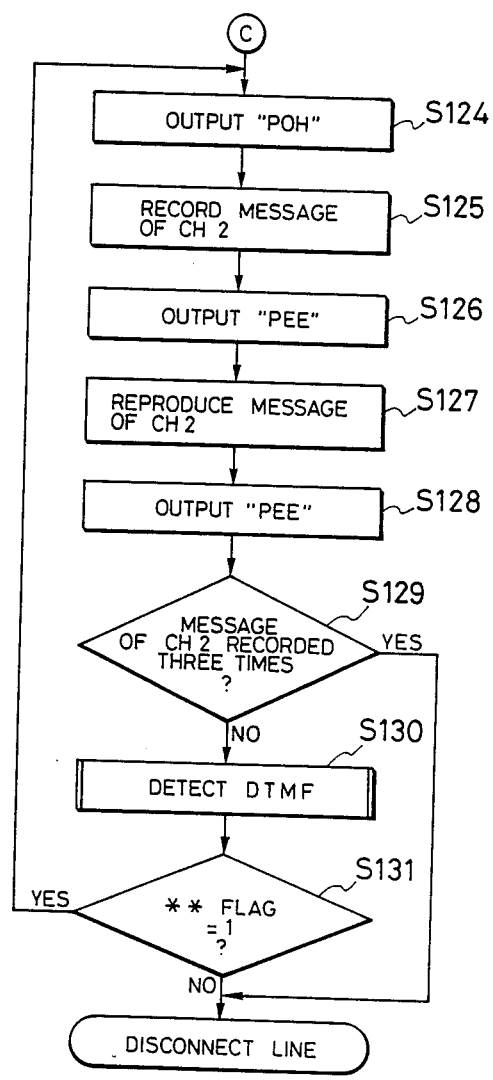

In a step S109, a sound to request sending tone dial signals, such as a "pee" sound, is sent to the calling station. In a step S110, a DTMF detect sub-routine to discriminate DTMF sent from the calling station is executed. As the DTMF detect sub-routine is executed, a secret number is sent from the calling station and a flag to select one of various modes of the machine is set. Then, the process goes out of the sub-routine and proceeds to a step S111. In the step S111, whether a secret number flag which is set when the secret number sent from the calling station is correct, is "1" or not is checked, and if it is "1", the process proceeds to a step S114 (FIG. 9). If it is not "1", the process proceeds to a step S112. In the step S112, whether a * * * flag which is set when the calling station has depressed the "*" key of a conventional dial key three times continuously is "1" or not is checked, and if it is "1", the process proceeds to a step S132 (FIG. 10). In a step S113, whether the operator of the calling station misoperated or not is checked, a facsimile protocol signal from the calling station is monitored for a predetermined time period, and if the protocol signal is not received during that period, the machine is turned off.

As the process proceeds to the step S114 from the step S111, whether the voice message is stored in the Ch 2 of the non-volatile RAM 64 or not is checked, and if it is stored, the voice message of the Ch 2 is reproduced and sent to the line. If the voice message is not stored, 0.5 second is idled in a step S115 as is done in the step S108. In a step S117 a "pee" sound to request the sending of DTMF is sent. In a step S118, a DTMF sub-routine to detect the DTMF sent from the calling station is started. In a step S119, a * * flag which is set when the operator of the calling station has depressed to "*" key twice continuously is checked. If it is "1", the process proceeds to a step S124 (FIG. 11), and if it is not "1", the process proceeds to a step S120 where a misoperation flag which is set when a misoperation has been made is checked. If the misoperation flag is "1", the line is disconnected, and if it is not "1", the process proceeds to a step S121. In the step S121, whether the voice message of the Ch 2 has been reproduced three times or not is checked. If it has been reproduced three times, the line is opened, if it has not been reproduced three times, the process proceeds to a step S122. In the step S122, whether the voice message is stored in the Ch 2 or not is again checked, and if the Ch 2 is empty, the line is opened, and if the voice message is stored in the Ch 2, it is reproduced and the process returns to the step S117.

On the other hand, if the * * flag is "1", the process proceeds to the step S124 (FIG. 11) where a sound to request the start of recording such as a "pou" sound is sent. In a step S125, the voice message from the line 77 (or voice message from a microphone of the machine) is recorded in the Ch 2. After the recording of the voice message for a predetermined time interval (for example, 8–16 seconds), a "pee" sound indicating the end of recording is sent in a step S126, the Ch 2 is automatically reproduced to confirm the recorded content in a step S127, and a "pee" sound to request DTMF to the calling station is sent in a step S128. In a step S129, whether the recording to the Ch 2 has been done three times or not is checked, and if it has been done three times, the line is opened, and if it has not been done three times, the DTMF detect routine is started in a step S130. In a step S131, the * * flag which is set when * * is detected is checked. If it is "1", the process returns to the step S124, and if it is not "1", the line is disconnected. Thus, the operator of the calling station may retry the recording up to three times by depressing the "*" key twice continuously.

On the other hand, when the * * * flag is "1" in the step S112, the process proceeds to the step S132 (FIG. 10) where a "pou" sound to inform the start of recording is sent. In a step S133, voice message from the line 77 or the microphone of the machine is recorded in the Ch 1. In a step S134, a "pee" sound to indicate the end of recording is sent. In a step S135, the Ch 1 is automatically reproduced to confirm the recorded message. In a step S136, a "pee" sound to request the sending of the DTMF is sent. In a step S137, whether the recording to the Ch 1 has been done three times or not is checked. If it has been done three times, the line is opened, and if it has not been done three times, the process proceeds to a step S138 where the DTMF detect routine is executed to detect the DTMF sent from the calling station. In a step S139, the * * * flag which is set when the * key is depressed three times continuously is checked, and if the * * * flag is "1", the process returns to the step S132. Otherwise, the line is disconnected. Thus, the operator of the calling station may retry the recording up to three times by depressing the * key three continuously.

Figure 12:
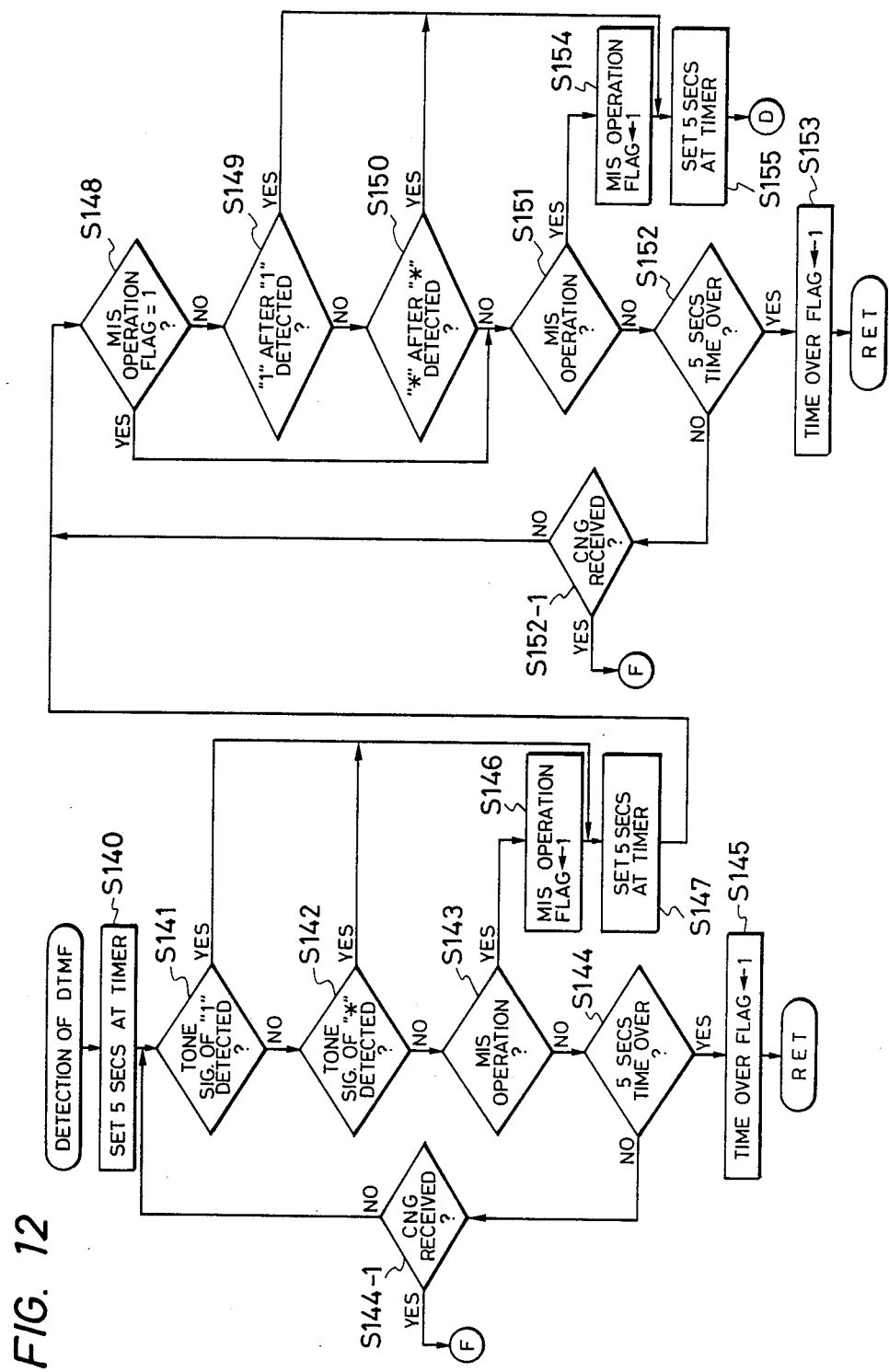
Figure 13:
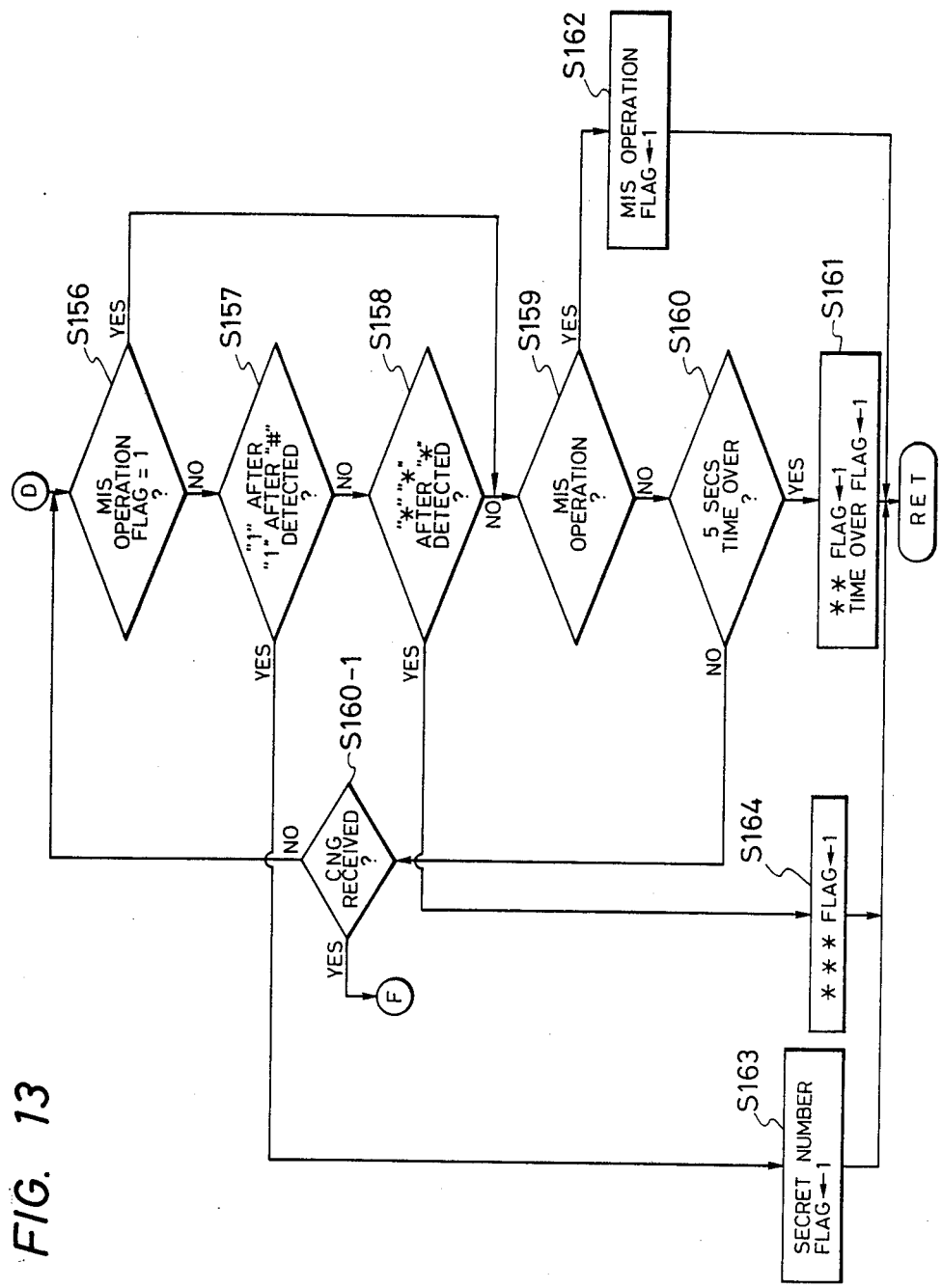

The DTMF detect sub-routine for detecting the DTMF is explained with reference to FIG. 12. It is assumed that "11" has been set in the rotary dip switch for the secret number.

In a step S140, a 5-second timer of the software timer of the CPU 61 is set. The DTMF detector 69 shown in FIG. 6 detects the DTMF sent from the calling station. In a step S141, whether the DTMF signal is "1" (tone dial signal is "1") or not is checked, and if it is "1", the process goes to a step S147, and if it is not "1", the process goes to a step S142. In the step S142, whether the tone dial signal is "*" of the * key or not is checked, and if it is *, the process proceeds to a step S147, and if it is not *, the process proceeds to a step S143. In the step S143, whether the calling station has sent the DTMF signal other than "1" and * signals or not is checked. If the tone signal other than "1" and * signals is detected in the step S143, the process proceeds to a step S146 where a misoperation flag is set. In a step S147, the 5-second timer is again set. If no tone dial signal is sent, the time-over of the 5-second timer is monitored in the step S144. If it times over, the time-over flag is set in a step S145 and the process returns. If it does not time over in the step S144, the process proceeds to a step S144-1 where whether a calling tone (CNG) signal indicating that the calling station wants the facsimile transmission has been received or not is checked. The facsimile protocol signal including the CNG signal is detected by the modem 78 through the NCU 76. If the reception of the CNG signal is detected in the step S144-1, the process proceeds to a step S183 of FIG. 6, and if it is not detected, the process returns to the step S141.

In a step S147, the 5-second timer is again set. In a step S148, whether the misoperation flag is "1" or not is checked. If it is "1", the process proceeds to a step S151, and if it is not "1", the process proceeds to a step S149 where whether "1" has been sent following to "1" or not, that is, whether "11" has been sent or not is checked. If "11" has been sent, the process proceeds to a step S155 where the 5-second timer is again set. If "11" has not been sent, the process proceeds to a step S150 from the step S149. In the step S150, whether * * has been sent or not is checked, and if * * has been sent, the process proceeds to a step S155. Otherwise, the process proceeds to a step S151. In the step S151, whether the tone dial signal other than "11" and * * has been detected or not is checked, and if such tone dial signal has been detected, the misoperation flag is set in a step S154 and the process proceeds to a step S155. In a step S152, if the second digit of the DTMF is not detected before the 5-second timer times over, the time-over flag is set in a step S153 and the process returns. If the time-over does not occur in the step S152, the process proceeds to a step S152-1 where whether the CNG signal has been received or not is checked like the step S144-1. If the CNG signal has been received, the process proceeds to a step S183, and if the CNG signal has not been received, the process returns to the step S148. In the step S155, the 5-second timer is again set. In a step S156 (FIG. 13), the misoperation flag is checked. If it is "1", the process proceeds to a step S159, and if it is not "1", the process proceeds to a step S157. In the step S157, if the # tone signal is detected after the detection of "11", the secret number flag is set to indicate that the secret number has been confirmed, in a step S163, and the process returns. If the detected tone signal is other than "11#" in the step S157, the process proceeds to a step S158. In the step S158, whether * has been detected after the detection of * * or not, that is, whether three continuous * * * have been detected or not is checked. If * * * have been detected, the * * * flag is set in a step S164 and the process returns. If * * * have not been detected, the process proceeds to a step S159 where whether the tone signal other than "11#" and * * * has been detected or not is checked. If such tone signal has been detected, the misoperation flag is set in a step S162 and the process returns. If the third digit is not detected, the time-over of the 5-second timer is monitored in the step S160, and if it times over, the time-over flag is set in a step S161. If only two continuous * * have been detected, the * * flag is set and the process returns. If the time-over is not detected, the process proceeds to a step S160-1. In the step S160-1, if the CNG signal has been received, the process proceeds to a step S182, and if it has not been received the process returns to the step S156.

As the process proceeds to the step S108 from the step S105 for the facsimile reception, a called equipment identification (CED) signal indicating that the equipment is a non-voice terminal (facsimile machine) is sent to the line 77 through the modem 78, line control unit 70 and NCU 76 in a step S181, and the process proceeds to a step S183. In the step S183, a digital identification signal (DIS) which is equipment information such as receiving function of the equipment is sent. In a step S184, whether a digital command signal (DCS) for determining a facsimile communication mode based on DIS has been received or not is checked, the facsimile mode is set in accordance with the detected DCS, and whether a training check signal (TCF) for checking the communication in the mode set by the DCS has been received or not is checked. If the DCS and TCF have been received, the process proceeds to a step S185. In the step S184, if no signal is received for a predetermined time period or the DCS and TCF have not been received within the predetermined time period, an error is detected and the line is opened (termination on error).

As the DCS and TCF have been received in the step S184 and a confirmation of ready for reception (CFR) signal which indicates that the equipment is ready to receive is sent in the step S185, whether an image signal or facsimile protocol signal (EOP which indicates end of protocol, EOM which indicates end of message or MPS which indicates multi-page signal) has been received or not is checked in steps S186 and S187. In the step S186, if the reception of the image signal is detected, the received image signal is demodulated by the modem 78 in a step S188, and it is decoded and recorded in the recorder 66 as binary image data. After one page of image signal has been received and recorded, the facsimile protocol signal is received and detected in the step S187. In steps S189, S191, S193 and S199, the protocol signal is checked. If the MPS signal id detected in a step S189, a message confirmation signal (MCF) is sent in a step S190 and the process returns to a step S186 where the next page of image signal is received and recorded. If the EMO signal is received in the step S191, the MCF signal is sent in a step S192 and the process returns to the step S183 where a pre-protocol of the facsimile protocol is carried out.

If the reception of the EOP signal is detected in a step S193, the MCF signal is sent in a step S194. In a step S195, if a line disconnection signal (DCN) is detected in a predetermined time period, the line 77 is opened in a step S196 and the process proceeds to a step S197.

In a step S199, if the reception of a speech request signal is detected, the operator is called by the speaker 75 and a speech mode is started.

In the step S197, whether the facsimile reception continues from the recording of the voice message onto the Ch 2 or not is checked. If the facsimile reception continues from the recording of the voice message, the image data such as "voice message included" which is stored in the non-volatile RAM 4 is read in the step S198 and it is printed out on the last line of the record sheet on which the received image is recorded. Thus, the operator at the calling station may transmit the image by the facsimile machine after he/she has recorded the voice message for the image data to be transmitted, into the DRAM 68. Since the information indicating the presence of the voice message is recorded on the record sheet on which the image is recorded, the operator can readily recognize the presence of the voice message for the received image.

The signals from the line in the steps S101 to S110 are outputted by the speaker of the machine. Accordingly, the voice from the calling station can be monitored without hooking off the handset.

If a person who is unaware of the specification of the machine calls, a person who is in the vicinity of the machine hears the voice and picks up the handset 71 shown in FIG. 6, and depresses a stop button on the keyboard of FIG. 7 to interrupt the message function so that he/she can communicate with the calling person in a manner similar to a conventional telephone conversation.

Figure 14:
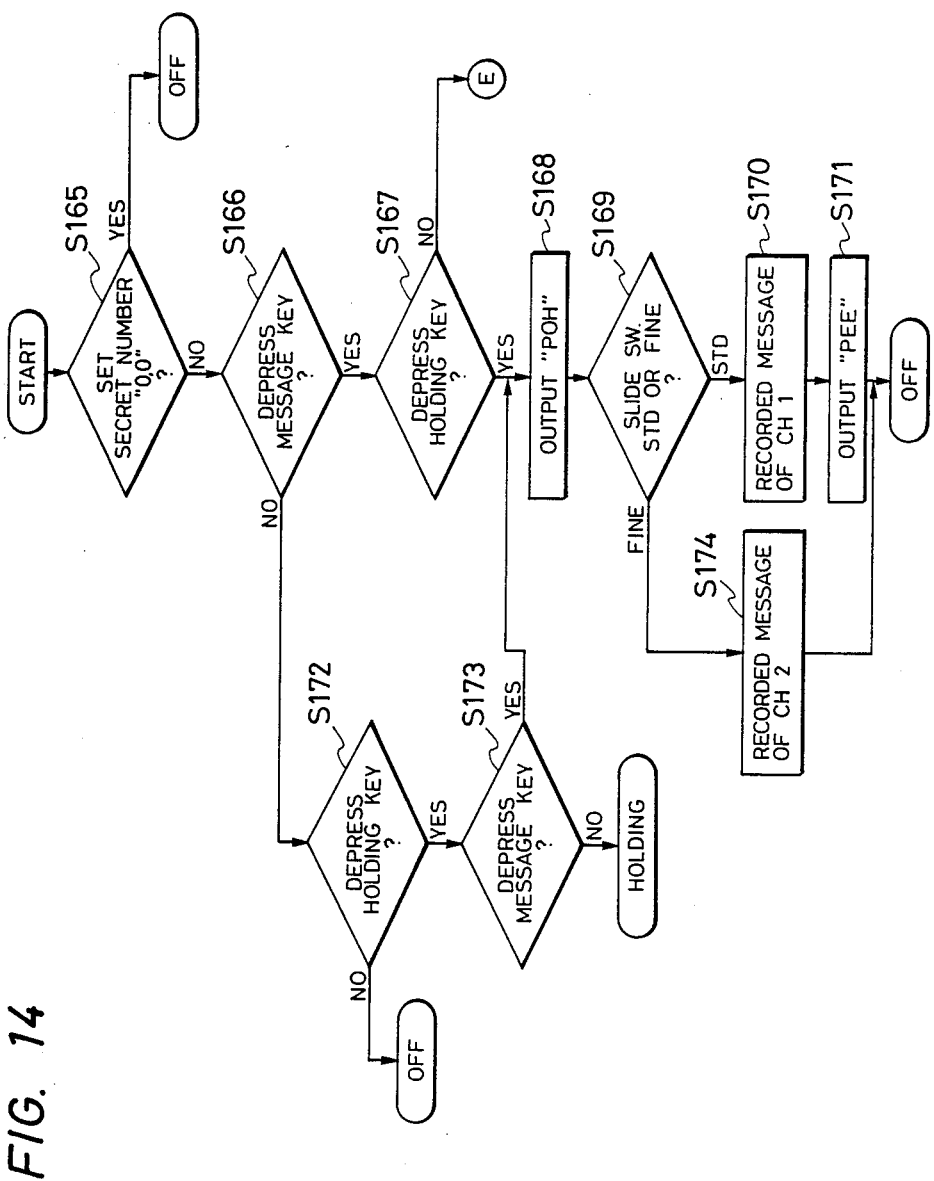
Figure 15:
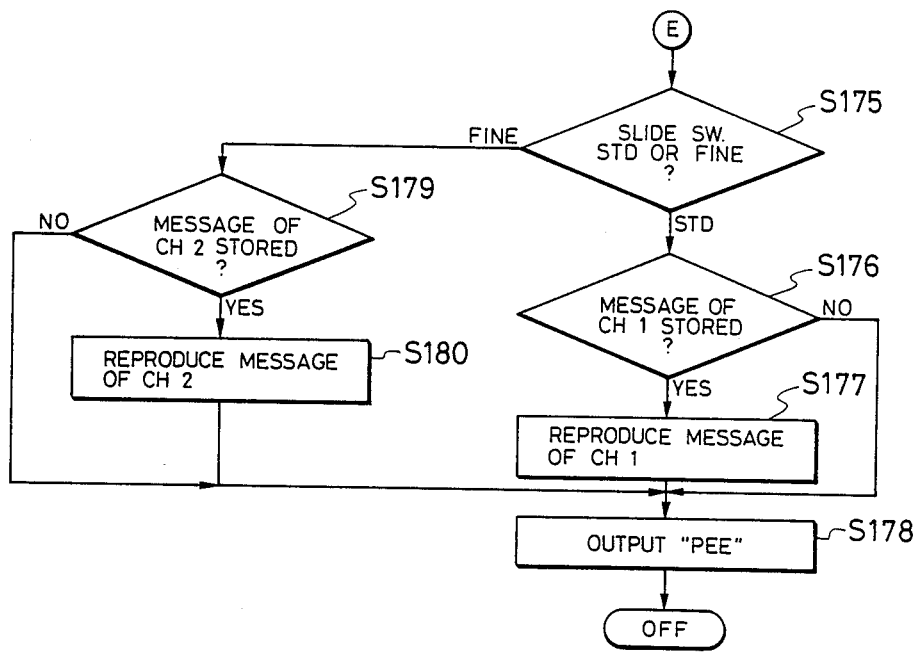

The operation to record a message by the microphone and reproduce it by the speaker of the machine is explained with reference to FIG. 14. In a step S165, whether the secret number has been set to "00" or not is checked. If it is "00", the line is opened. If it is not "00", whether the message key 22 on the keyboard of FIG. 7 has been depressed or not is checked in a step S166. If it has been depressed, the process proceeds to a step S167, and if it has not been depressed, the process proceeds to a step S172. In the step S167, whether the hold key 23 has been depressed or not, that is, whether the message key 22 and the hold key 23 have been simultaneously depressed or not is checked. If it has been depressed, the process proceeds to a step S168, and if it has not been depressed, the process proceeds to a step S175. In the step S172, whether the hold key 23 has been depressed or not is checked, and if it has been depressed, the process proceeds to a step S173, and if it has not been depressed, the line is opened. In the step S173, whether the message key 22 has been depressed or not, that is, whether the hold key 23 and the message key 22 have been simultaneously depressed or not is checked, and if it has been depressed, the process proceeds to a step S168, and if it has not been depressed, the line is held. In a step S168, the start of recording is requested. That is a "pou" sound is produced from the speaker. In a step S169, whether the slide switch 24 on the keyboard of FIG. 7 selects standard or fine is checked. If it selects standard, the Ch 1 recording is performed in a step S170, and if it selects fine, the Ch 2 recording is performed in a step S174. In a step S171, a "pee" sound is sent to inform the end of recording, and the line is opened.

In the step S167, if only the message key 22 has been depressed, the process proceeds to a step S175 (FIG. 10) where whether the slide switch 24 selects standard or fine is checked. If it selects standard, the process proceeds to a step S179, and if it selects fine, the process proceeds to a step S176. In the step S179, whether the Ch 2 includes any content or not is checked. If it is empty, the process proceeds to a step S178. If it includes a content, the Ch 2 content is reproduced in a step S180 and the process proceeds to a step S178. If the slide switch 24 selects standard, whether the Ch 1 includes any content or not is checked in a step S176. If it is empty, the process proceeds to the step S178, and if it includes a content, the Ch 1 content is reproduced in the step S177 and the process proceeds to the step S178 where a "pee" sound is sent to indicate the end of reproduction or that the Ch 1 or Ch 2 is empty, and the line is opened.

In the second embodiment, when the machine is set in the auto-receive mode, the automatic voice response and the facsimile auto-reception are carried out. If the auto-voice response mode is selected, the voice message recorded on the Ch 1 of the DRAM 68 is sent. Even in the auto-voice response mode, if the facsimile protocol signal is received after the voice message has been sent, the facsimile reception is automatically carried out. In the auto-receive mode, the voice from the calling station can be monitored. Thus, the operator may stop the auto-voice response before the facsimile reception is started so that he/she can communicate with the calling person.

If the machine is set in the facsimile auto-receive mode, the facsimile reception is immediately started.

In the present embodiment, priority to the voice communication or facsimile communication can be selected. If the auto-voice response mode is selected, the machine can be used primarily for speech communication but the facsimile auto-reception is permitted. In the auto-voice response mode, a certain time is required before the facsimile reception is started. Accordingly, if the machine is to be used primarily for the facsimile communication, it may be set in the facsimile auto-receive mode.

In the present embodiment, the voice message of the Ch 1 which is used for voice response can be rewritten by entering the secret number by the tone dial signal of the telephone set. For example, the voice message "I am now at O O" can be rewritten to "I am now at X X".

In the present embodiment, when the voice signal is sent to the other station, it is sent a predetermined time after the line capture so that the operator at the other station can securely listen the voice signal.

In the present embodiment, when the voice message is recorded through the off-site telephone, the recorded message is automatically reproduced so that the operator can confirm whether the voice message has been exactly recorded or not. Further, the recording of the voice message may be retried up to three times.

While the integrated telephone/facsimile machine has been described in the present embodiment, it may be a data communication apparatus such as a telex machine, and it need not be an integrated machine.

The present invention is not limited to the illustrated embodiments but various modifications thereof may be made.

We claim:

1. A communication apparatus comprising:
    data communication means for communicating data;
    voice communication means for communicating voice;
    speech means for communicating speech;
    setting means responsive to an incoming call for first setting said apparatus in any one of a manual communication mode in which an operator answers a communication request from a calling station by said speech means, an auto-data communication mode in which said data communication means automatically answers a communication request from a calling station, or an auto-voice communication mode in which said voice communication means automatically answers a communication request from a calling station;
    detecting means for detecting a signal relating to data communication from a calling station; and
    control means for selecting the auto-voice communication mode by said voice communication means or the data communication mode by said data communication means, wherein said control means switches said apparatus from the voice communication mode to the data communication mode in response to the detection of said signal by said detection means in the auto-voice communication mode.

2. A communication apparatus according to claim 1, further comprising monitor means for distinguishably outputting a signal sent from a calling station during the auto-voice communication mode by voice communication means.

3. A communication apparatus comprising:
    data communication means for communicating data;
    voice communication means for communicating voice;
    speech means for communication speech;
    setting means responsive to an incoming call for first setting said apparatus in any one of a manual communication mode in which an operator answers a communication request from a calling station by said speech means, an auto-data communication mode in which said data communication means automatically answers a communication request from a calling station or an auto-voice communication mode in which said voice communication means automatically answers a communication request from a calling station.

4. A communication apparatus according to claim 3, further comprising monitor means for distinguishably outputting a signal sent from a calling station, wherein said monitor means is automatically enabled by said setting means when said apparatus is set in the auto-voice communication mode.

5. A communication apparatus according to claim 3, wherein said voice communication means includes means for recording voice sent from a calling station and means for reproducing recorded voice; and
    records, reproduces or records and reproduces that voice in accordance with a command signal sent from the calling station.

6. A communication apparatus according to claim 3, wherein the data communication request signal indicates that the calling station is non-voice terminal.

* * * * *

UNITED STATES PATENT AND TRADEMARK OFFICE
CERTIFICATE OF CORRECTION

PATENT NO. : 4,932,048
DATED : June 5, 1990
INVENTOR(S) : TOSHIO KENMOCHI ET AL.

It is certified that error appears in the above-identified patent and that said Letters Patent is hereby corrected as shown below:

COLUMN 2

Line 27, "the," should read --the--.
    Line 66, "CPU 1. The DTMF detection" should read --CPU. ¶ The DTMF detection--.

COLUMN 3

Line 5, "handset" should read --handset 11--.
    Line 30, "line" should read --line 17--.

Line 48, "voice In" should read --voice. In--.

COLUMN 4

Line 7, ""(4+4)1#" 1," should read --"(4+4)1#";--.

COLUMN 5

Line 12, "b" should read --be--.

COLUMN 7

Figure 8:
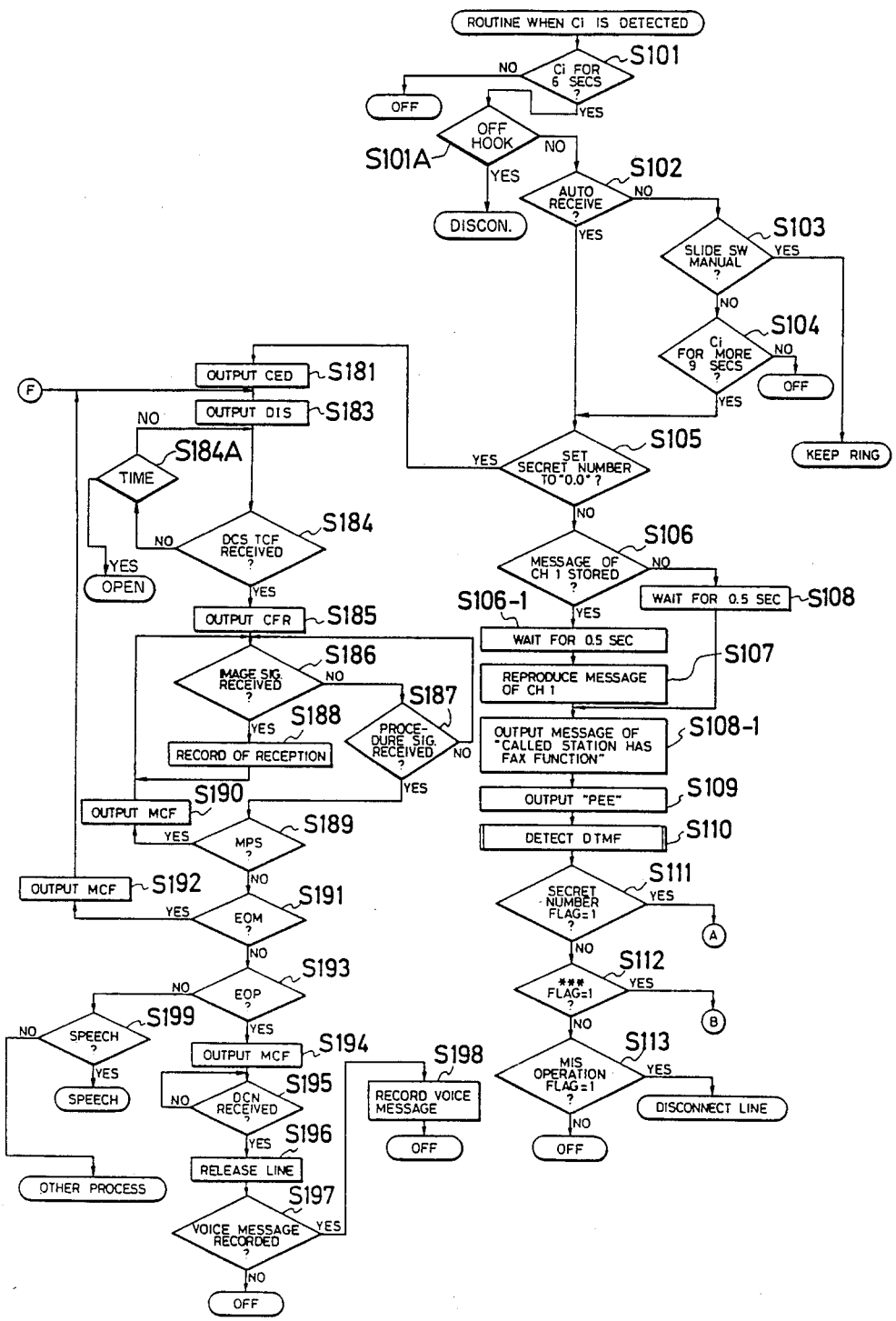
FIGS. 8 to 15 show flow charts of control operations in the second embodiment.

Line 37, "FIGS." should read --FIGS. 8--.
    Line 68, "of" should read --off--.

UNITED STATES PATENT AND TRADEMARK OFFICE
CERTIFICATE OF CORRECTION

PATENT NO.    : 4,932,048
DATED         : June 5, 1990
INVENTOR(S)   : TOSHIO KENMOCHI ET AL.

It is certified that error appears in the above-identified patent and that said Letters Patent is hereby corrected as shown below:

COLUMN 8

Line 15, "1.05 second" should read --0.5 second--.
    Line 21, "taneously" should be deleted.

COLUMN 11

Line 43, "id" should read --is--.

COLUMN 14

Line 29, "communiction" should read --communicating--.

Signed and Sealed this

Seventh Day of April, 1992

Attest:

HARRY F. MANBECK, JR.

*Attesting Officer*     Commissioner of Patents and Trademarks